(12) United States Patent
Rajkotia (10) Patent No.: US 7,813,746 B2
(45) Date of Patent: Oct. 12, 2010

(54) WIRELESS NETWORK USING SHARED TRAFFIC CHANNEL MODE OF OPERATION FOR BROADCAST SERVICES

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1072 days.

(21) Appl. No.: 10/693,753

(22) Filed: Oct. 24, 2003

(65) Prior Publication Data

US 2005/0090276 A1    Apr. 28, 2005

(51) Int. Cl.
*H04B 7/00* (2006.01)
(52) U.S. Cl. ...................................................... 455/515
(58) Field of Classification Search .................. 455/515
See application file for complete search history.

(56) References Cited

U.S. PATENT DOCUMENTS

| | | | | |
|---|---|---|---|---|
| 6,091,717 | A * | 7/2000 | Honkasalo et al. .......... | 370/329 |
| 7,062,272 | B2 * | 6/2006 | Grilli et al. .............. | 455/435.1 |
| 7,110,747 | B2 * | 9/2006 | Jain et al. .................... | 455/411 |
| 7,133,675 | B2 * | 11/2006 | Hunzinger .................. | 455/437 |
| 7,437,170 | B2 * | 10/2008 | Dunn et al. ................. | 455/518 |
| 2004/0213280 | A1 * | 10/2004 | Patel .......................... | 370/441 |
| 2005/0025082 | A1 * | 2/2005 | Jang et al. ................... | 370/312 |
| 2005/0037778 | A1 * | 2/2005 | Patel ....................... | 455/456.3 |
| 2006/0116149 | A1 * | 6/2006 | Dunn et al. ................. | 455/518 |
| 2006/0203767 | A1 * | 9/2006 | An et al. ...................... | 370/328 |
| 2007/0025350 | A1 * | 2/2007 | Kyung et al. ................ | 370/390 |

FOREIGN PATENT DOCUMENTS

| | | |
|---|---|---|
| EP | 0828355 A2 * | 11/1998 |
| EP | 0828355 A2 * | 11/1998 |
| WO | WO 2005034531 A2 * | 4/2005 |

* cited by examiner

*Primary Examiner*—Matthew D Anderson
*Assistant Examiner*—Bobbak Safaipour (57) ABSTRACT

A wireless network base station for transmitting broadcast data to a plurality of mobile stations in a coverage area of the base station. The base station transmits a first control message to the mobile stations that assigns a shared public long code mask (PLCM) to the mobile stations. The base station also transmits a second control message to the mobile stations that assigns a shared Walsh Code (WC) to the mobile stations. Thereafter, the base station transmits the broadcast data to the mobile stations using the shared PLCM and the shared WC.

20 Claims, 5 Drawing Sheets

WIRELESS NETWORK USING SHARED TRAFFIC CHANNEL MODE OF OPERATION FOR BROADCAST SERVICES

TECHNICAL FIELD OF THE INVENTION

The present invention is directed generally to wireless communication systems and, more specifically, to mobile stations and base stations that use a shared traffic channel to perform broadcast services.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. The price of wireless devices has decreased to the point where these devices are affordable to nearly everyone and the price of a wireless device is only a small part of the total cost to the user (i.e., subscriber). To continue to attract new customers, wireless service providers are implementing new services, especially digital data services that, for example, enable a user to browse the Internet and to send and receive e-mail.

Earlier code division multiple access (CDMA) networks, such as IS-95 networks, carried only a very small amount of data traffic. However, third generation wireless networks, such as IS-2000 (also called CDMA2000), are designed to carry much heavier loads of data traffic. IS-2000 networks are capable of efficiently providing both high-speed data services and voice traffic. Still other networks, such as 1xEV-DO networks, are primarily data systems. These types of networks, if used for both voice and data, typically carry voice on an adjacent channel to data traffic. However, IS-2000 networks (i.e., Release C of CDMA2000) carry voice and data on the same carrier.

One important feature of IS-2000 networks (EV-DV—Release C) is the use of a Forward Packet Data channel (F-PDCH) and a Forward Supplemental channel (F-SCH) that are capable of transmitting voice and data traffic from a network base station to a wireless terminal (or mobile station). The F-SCH normally carries data traffic and the F-PDCH usually carries voice traffic. The F-SCH may be flexibly allocated to different subscribers, as data services are needed, thereby conserving the bandwidth resources of a base station.

Data broadcast services (or multicast services) are examples of new services that wireless providers are implementing in wireless networks, including IS-2000 networks. These services may provide a very large market for the anemic data market. AS a result, broadcast (or multicast) service is expected to become a very prominent feature for the next release of wireless standards. In a data broadcast (or multicast), the same information (e.g., sports scores, weather reports, news, and the like) is transmitted to all (or at least a plurality) of the wireless terminals (or mobile stations) in the coverage area of a wireless network base station.

For the sake of simplifying the descriptions that follow, the term "broadcast service" may be used hereafter to refer to both a broadcast service and a multicast service, except as otherwise noted or where both terms are explicitly used.

Qualcomm has proposed using new, dedicated channels in wireless networks to perform broadcast services. However, using dedicated channels for broadcast and/or multicast services reduces the amount of available network resources. In any wireless system (CDMA, TDMA, GSM, or the like), a fixed number of resources (i.e., radio channels, time slots, etc.) are available for communicating with mobile stations. Therefore, using a dedicated resource for broadcast and/or multicast services reduces the number of resources available for conventional voice and data services, even if the broadcast and/or multicast services are lightly used or not used at all.

Therefore, there is a need in the art for improved systems and methods of performing broadcast services and multicast services in a wireless network. In particular, there is a need for wireless network technology that does not use dedicated resources to perform broadcast services and multicast services.

SUMMARY OF THE INVENTION

The present invention proposes a technique that performs broadcast services and multicast services by sharing an existing traffic channel, rather than using a new, dedicated channel. In particular, the present invention uses the existing fundamental channels (e.g., F-PCH) and existing supplemental channels (e.g., F-SCH) in a shared manner to perform data broadcasts and data multicasts. The present invention also provides a method by which a particular mobile station (MS) may be alerted in the shared traffic channel. This allows the mobile station to receive a voice or packet data call one the shared traffic channel while monitoring the shared traffic channel for broadcasts or multicasts.

To address the above-discussed deficiencies of the prior art, it is a primary object of the present invention to provide, for use in a wireless network, a base station capable of transmitting broadcast data to a plurality of mobile stations in a coverage area of the base station. According to an advantageous embodiment of the present invention, the base station is capable of transmitting a first control message to the plurality of mobile stations, the first control message operable to assign a shared public long code mask (PLCM) to the plurality of mobile stations.

According to one embodiment of the present invention, the base station is further capable of transmitting a second control message to the plurality of mobile stations, the second control message operable to assign a shared Walsh Code (WC) to the plurality of mobile stations.

According to another embodiment of the present invention, the base station transmits the broadcast data to the plurality of mobile stations using the shared PLCM and the shared WC.

According to still another embodiment of the present invention, the base station is further capable of transmitting mobile station-specific information to a first target mobile station by transmitting in the broadcast data a first packet data unit containing a first address identifier associated with the first target mobile station.

According to yet another embodiment of the present invention, the base station assigns the first address identifier to the first target mobile station.

According to a further embodiment of the present invention, the base station is further capable of transmitting multicast information to a first group of mobile stations by transmitting in the broadcast data a second packet data unit containing a second address identifier associated with the first group of mobile stations.

According to a still further embodiment of the present invention, the base station assigns the second address identifier to the first group of mobile stations.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
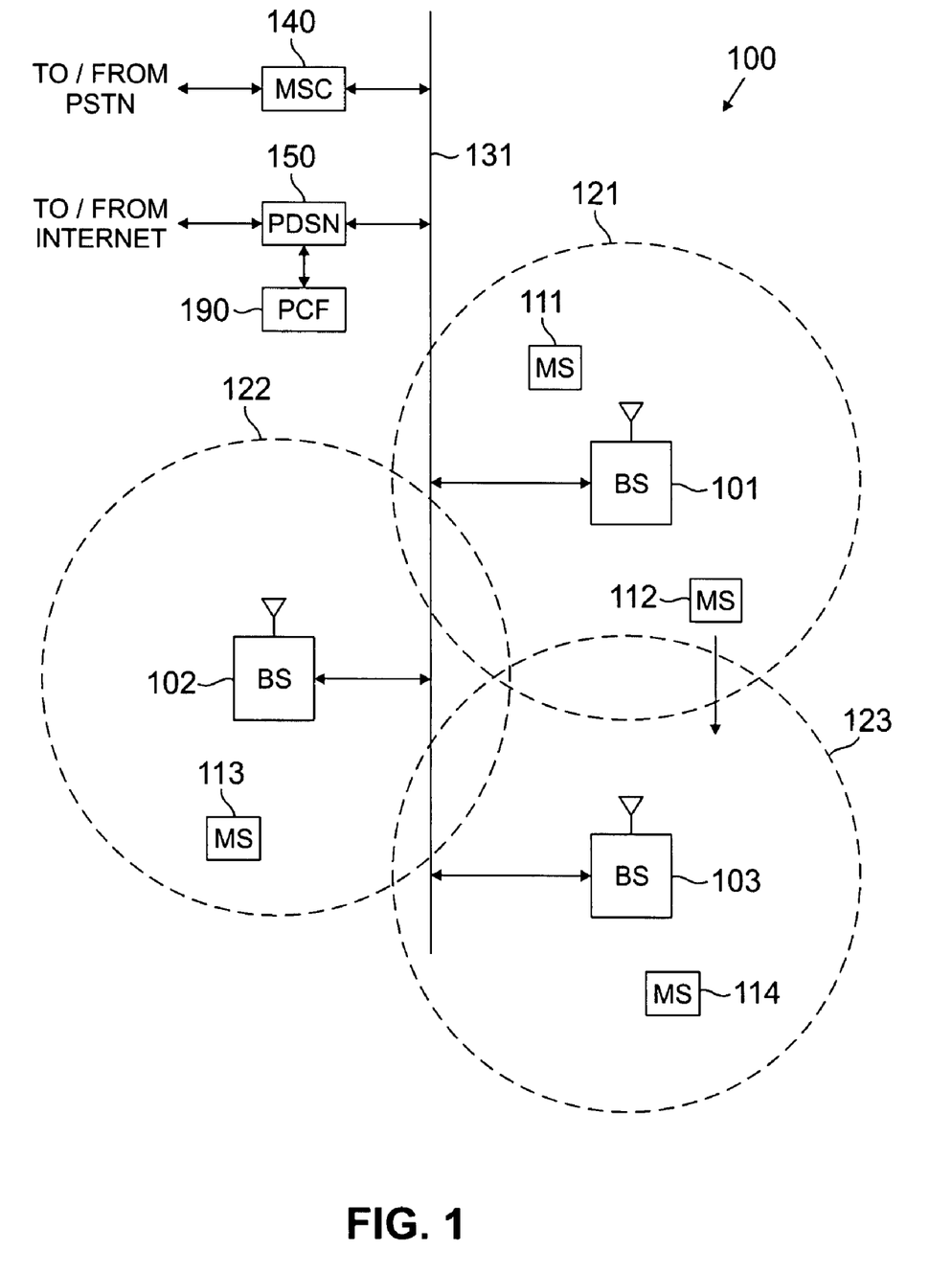
FIG. 1 illustrates an exemplary wireless network in which broadcast service are performed in a shared traffic channel according to the principles of the present invention.

FIG. 1 illustrates exemplary wireless network 100 in which broadcast service are performed in a shared traffic channel according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to the IS-2000C standard (i.e., Release C of cdma2000). In an advantageous embodiment of the present invention, MS 111-114 are capable of receiving data traffic and/or voice traffic on two or more CDMA channels simultaneously. Mobile stations 111-114 may be any suitable wireless devices, including conventional cellular radiotelephones, PCS handset devices, personal digital assistants, portable computers, telemetry devices, and the like, which are capable of communicating with base stations 101-103 via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors (shown in FIG. 2), where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, the mobile stations operating in wireless network 100 are capable of receiving broadcast data and multicast data on shared traffic channels. For example, in an IS-2000 embodiment, each of BS 111-113 may transmit, and each of MS 111-114 may receive, broadcast data and/or multicast data in the Forward Packet Data Channel (F-PDCH) or the Forward Supplemental Channel (F-SCH), or both. Advantageously, the present invention may be implemented in a conventional IS-2000 wireless network by modifying the control message software and the call stacks of both the mobile stations and the base stations.

Figure 2:
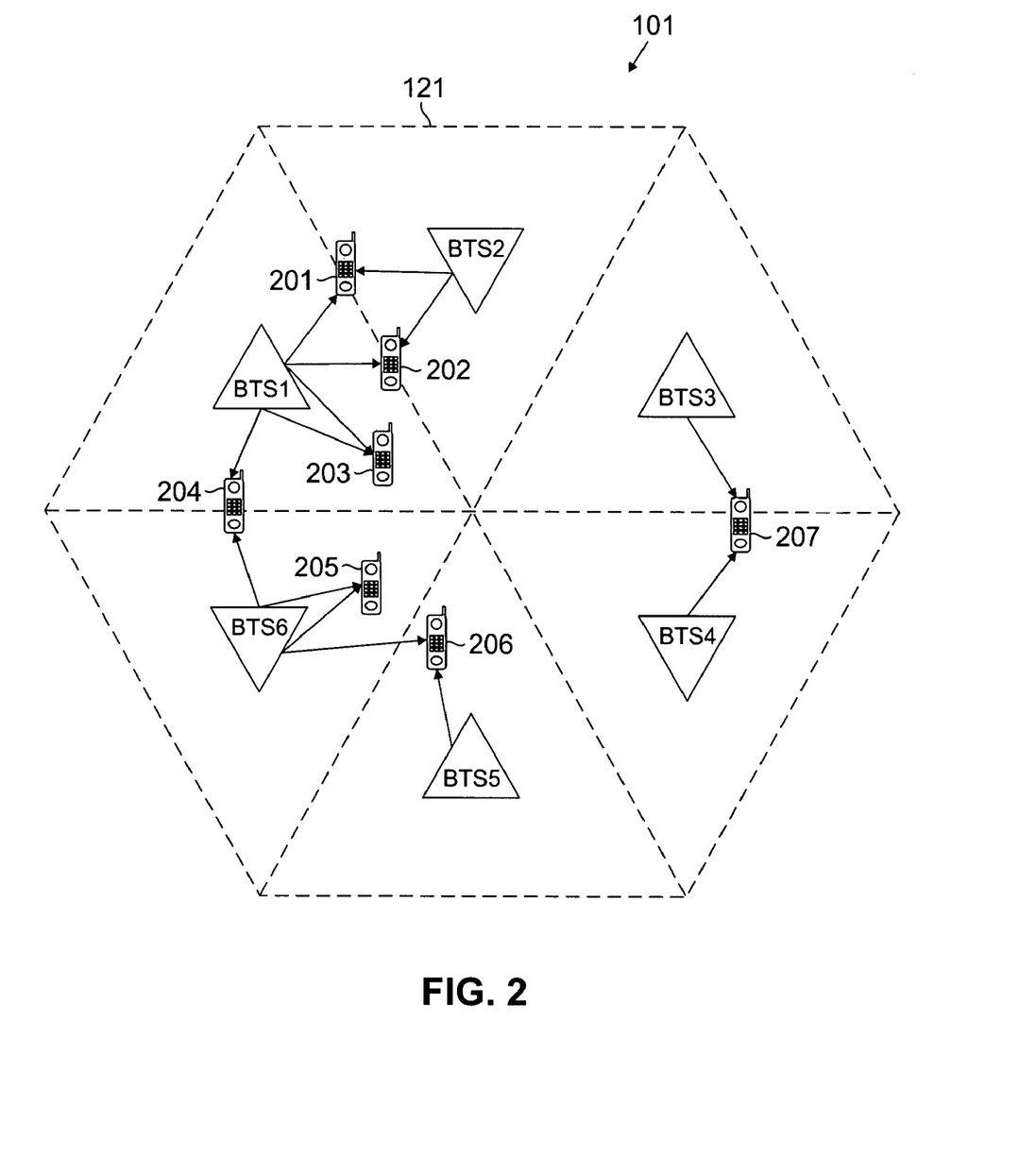
FIG. 2 illustrates broadcast transmissions to a plurality of mobile stations in the wireless network in FIG. 1 according to one embodiment of the present invention.

FIG. 2 illustrates broadcast (or multicast) transmissions to a plurality of mobile stations in wireless network 100 according to one embodiment of the present invention. Base station is shown in greater detail. Base station 101 comprises six base transceiver subsystems, labeled BTS1, BTS2, BTS3, BTS4, BTS5 and BTS6. Cell site 121 of base station 101 is shown as a hexagonal shape (rather than a circle, as in FIG. 1) for the purposes of illustration and explanation only. Each base transceiver subsystem (BTS) uses a three-sector antenna, where each of the three sectors (sector $\alpha$, sector $\beta$, sector $\gamma$) covers 120 degrees of arc. The coverage area of each BTS is shown as a triangle. The six triangles form the hexagonal coverage area of base station 101.

In FIG. 2, three exemplary broadcast (or multicast) data streams are being transmitted. One sector of BTS2 transmits a first broadcast (or multicast) data stream to mobile stations 201 and 202. One sector of BTS1 also transmits the same first broadcast data stream to mobile stations 201 and 202. Two different sectors of BTS1 transmit the first broadcast data stream to mobile station 203. Finally, one sector of BTS1 and one sector of BTS6 transmit the first broadcast data stream to mobile station 204.

Two different sectors of BTS6 transmit a second broadcast (or multicast) data stream to mobile station 205. One sector of BTS6 transmits the second broadcast data stream to mobile station 206. Finally, one sector of BTS5 also transmits the second broadcast data stream to mobile station 206.

One sector of BTS3 transmits a third broadcast (or multicast) data stream to mobile station 207. Finally, one sector of BTS4 also transmits the third broadcast data stream to mobile station 207.

Since BTS1-BTS6 are transmitting the first, second and third broadcast data streams using a shared traffic channel, at least some of mobile stations 201-207 receive the broadcast data streams from more than one BTS. This enhances mobile station reception and is similar to a handoff operation in which a CDMA mobile station receives forward channel signals from two or more base transceiver subsystems.

Figure 3:
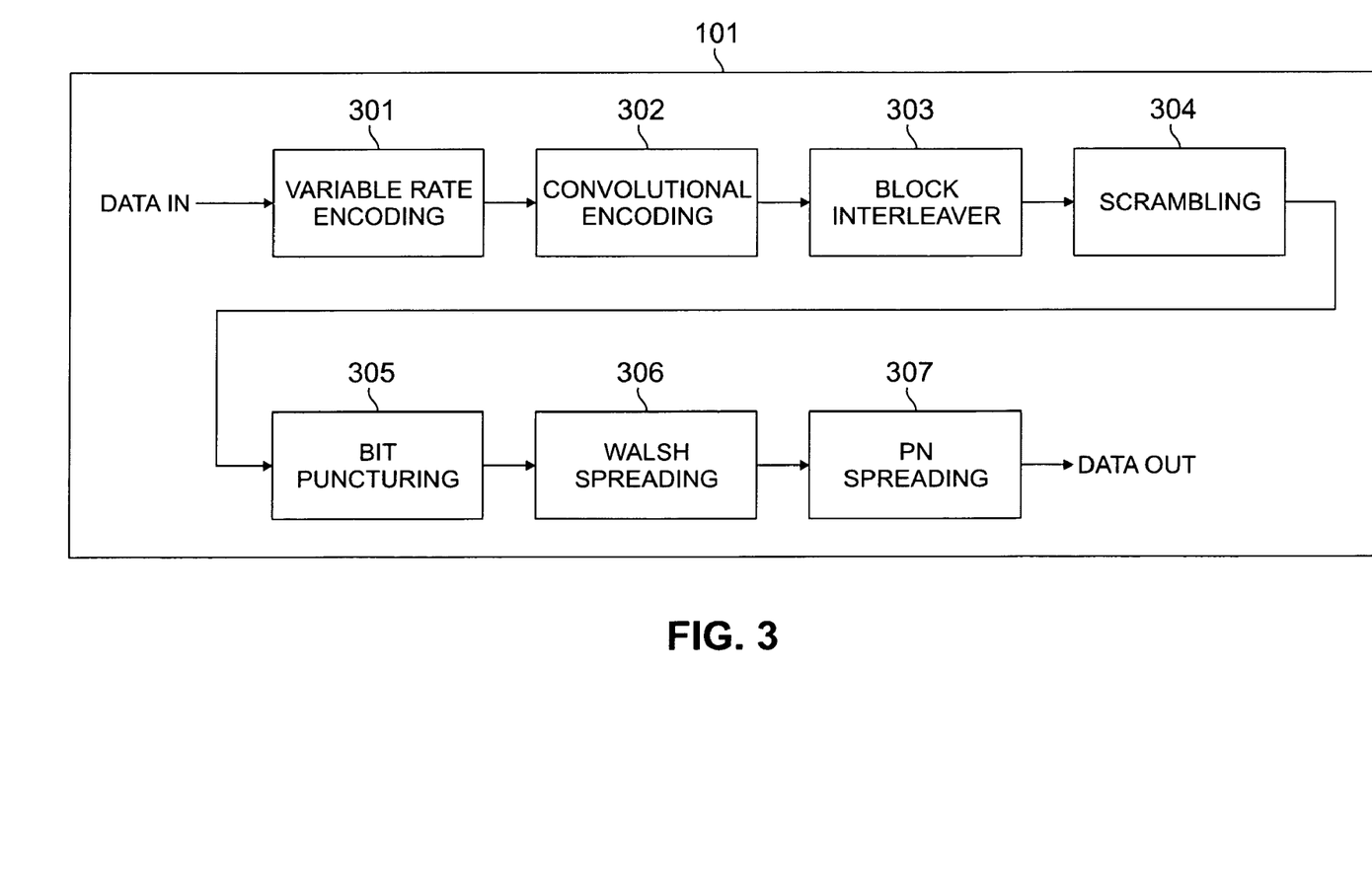
FIG. 3 illustrates selected processing blocks in an exemplary base station according to one embodiment of the present invention.

FIG. 3 illustrates selected digital processing blocks in exemplary base station (BS) 101 according to one embodiment of the present invention. BS 101 comprises variable rate encoding block 301, convolutional encoding block 302, block interleaver block 303, scrambling block 304, bit puncturing block 304, Walsh code spreading block 306, and pseudo-random noise (PN) spreading block 307. Digital data (DATA IN) from one or more sources enters variable rate encoding block 301. The digital output data (DATA OUT) from PN spreading block 307 are sent to RF modulation circuitry (not shown) for up-conversion to a radio frequency (RF) signal suitable for transmission in the forward channels of wireless network 100.

The digital processing blocks in FIG. 3 are well known to those of ordinary skill in the art. Therefore, it unnecessary to explain in this disclosure the operation of each of blocks 301-307. However, it is noted that, of all the data transformations performed by blocks 301-307, it is scrambling block 304 that makes the digital information unique to each mobile station. Scrambling is the process by which the output of block interleaver block 303 is scrambled using a public long code mask (PLCM). The scrambling step helps to prevent RF spikes. The scrambling step also provides a measure of security by using the ESN of each mobile station to generate a long code sequence that is unique to each mobile station, or by the base station assigning a public long code mask. Descrambling in the mobile station requires the generation of the same long code sequence using the ESN of the mobile station, or by using the base station-assigned PLCM.

The present invention implements broadcast (multicast) services by using a base station-assigned PLCM, rather than a PLCM generated using the ESN of a particular mobile station. According to an advantageous embodiment, the PLCM type to be used is[0001]. If the PLCM type is equal to [0001], then bits M36 through M32 of the PLCM are set to [11000] and bits M31 through M0 of the PLCM are specified by PLCM_32 and are assigned by the base station.

Since the base station now assigns the PLCM, the BS can transmit the PLCM to all mobile stations or to a select group of interested mobile stations that want to receive the broadcast data transmitted on the shared traffic channel. Since the mobile stations are given the PLCM information, the mobile stations are able to decode the broadcast data. Thus, a dedicated broadcast (multicast) channel is not required and the existing channel structure transmits the broadcast information with little change in the way scrambling is done.

The mobile stations share the broadcast data sent on the shared forward traffic channel. However, it may be necessary to send information just to a specific mobile station on the shared traffic channel. For example, there may be ten mobile stations sharing the same traffic channel, but only one of the mobile stations wants to perform a handoff procedure. If the handoff direction message (e.g., GHDM, UHDM) is sent on the shared forward traffic channel, all ten mobile stations will receive and decode the handoff direction message. Thereafter, all ten mobile stations will perform the handoff, nine of them unnecessarily. To avoid this and similar problems caused by sharing mobile specific messages, the present invention implements the use of an address identifier in the message packet data unit (PDU) when the traffic channels are being shared by multiple mobile stations.

Figure 4:
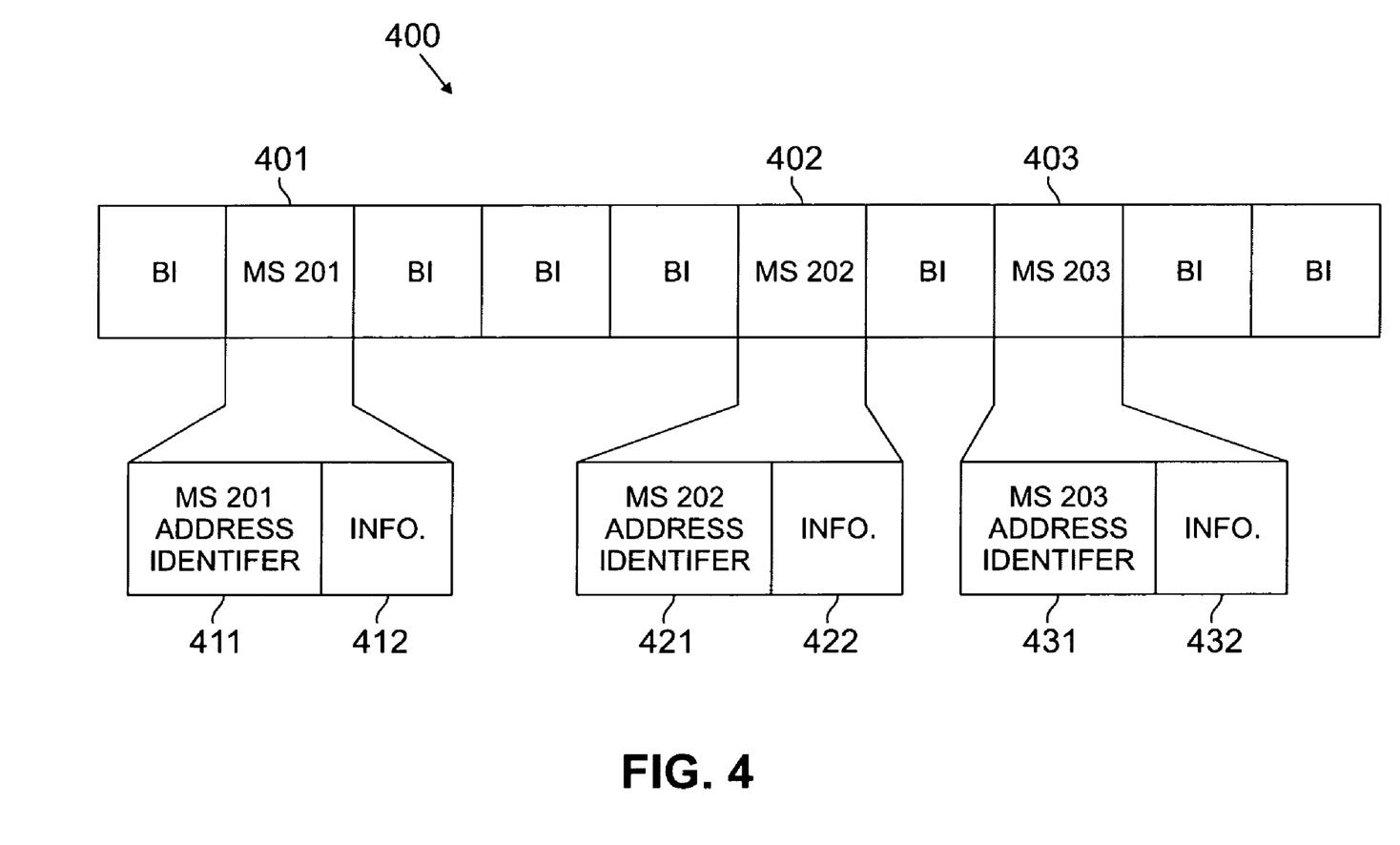
FIG. 4 illustrates the transmission of broadcast data and mobile station-specific data according to an exemplary embodiment of the present invention.

FIG. 4 illustrates the transmission of broadcast stream 400, which contains broadcast data and mobile station-specific data according to an exemplary embodiment of the present invention. Broadcast stream 400 comprises a sequence of packet data units (PDUs). Some packet data units contain only broadcast information (BI) that is usable by all mobile stations. However, packet data unit (PDU) 401, packet data unit (PDU) 402, and packet data unit (PDU) 403 contain both an address identifier and mobile specific data (or information).

PDU 401 is directed to MS 201 and comprises MS 201 address identifier field 411 and mobile specific information (INFO) field 412. PDU 402 is directed to MS 202 and comprises MS 202 address identifier field 421 and mobile specific information (INFO) field 422. PDU 403 is directed to MS 203 and comprises MS 203 address identifier field 431 and mobile specific information (INFO) field 432.

All mobile stations will receive a PDU containing an address identifier for a target mobile station that has been transmitted on the shared forward traffic channel. However, since the address identifier belongs only to the target mobile station, only the target mobile station decodes the mobile-specific PDU information. All other mobile stations ignore the message.

Hence, if a particular message, such as a UHDM, is directed only to MS 201, the PDU containing the UHDM also contains the address identifier of MS 201. MS 201 receives and decodes the UHDM information and then performs the handoff. At the same time, the other mobile stations ignore the UHDM and wait for the next packet.

Each base station may assign a local address identifier to each mobile station. This allows the use of address identifiers containing fewer bits than the mobile station ESN value. The local address identifiers of one base station may be re-used only by a remote base station, thereby avoiding address identifier conflicts. Advantageously, address identifiers may be used to perform multicasts. This may be accomplished by assigning each mobile station a unique address identifier used only by that mobile station, as well as a group identifier that is shared with a selected multicast group of mobile stations. The base station performs the multicast by using the group identifier in the packet data units directed to the selected multicast group.

Figure 5:
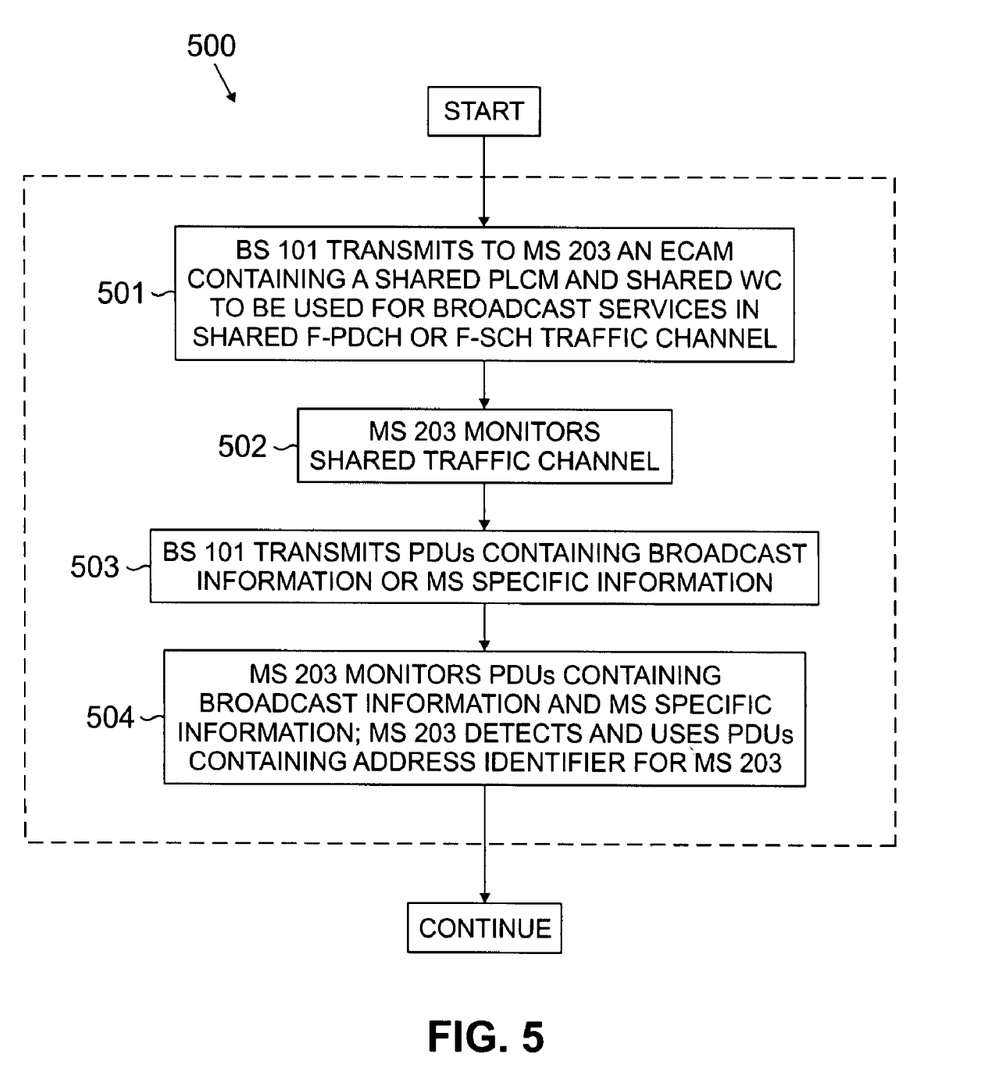
FIG. 5 is a flow diagram illustrating a broadcast operation in the wireless network according to the principles of the present invention.

FIG. 5 depicts flow diagram 500, which illustrates a broadcast operation in wireless network 100 according to the principles of the present invention. Initially, BS 101 transmits to MS 203 an Extended Channel Assignment Message (ECAM) containing a shared public lone code mask (PLCM) value and a shared Walsh code (WC) value to be used for broadcast services in a shared F-PDCH or F-SCH traffic channel (process step 501). Thereafter, MS 203 monitors the shared traffic channel (process step 502). At some point, BS 101 transmits packet data units containing broadcast information and/or mobile station-specific information (process step 503). MS 203 monitors the packet data units containing broadcast information and mobile station-specific information and MS 203 detects and uses only the packet data units containing the address identifier for MS 203 (process step 504).

In conventional wireless networks, a PDU transmitted on the traffic channel does not carry MS address identifiers. The conventional PDU does not need to, because the traffic channels are always dedicated to a particular mobile station (i.e., not shared) and there is always a fixed address. The present invention discloses a technique to share the traffic channel. The sharing of traffic channel improves capacity and power efficiency. More mobile stations can be accommodated within the same pool of Walsh codes and transmission power. Advantageously, traffic channel sharing does not take away the flexibility of transmitting MS specific information.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a base station capable of transmitting broadcast data over a shared traffic channel to a plurality of mobile stations in a coverage area of said base station,
    wherein said base station is capable of transmitting a first control message over said shared traffic channel to said plurality of mobile stations, said first control message operable to assign a shared public long code mask (PLCM) to said plurality of mobile stations, transmitting a second control message to said plurality of mobile stations, said second control message operable to assign a shared Walsh Code (WC) to said plurality of mobile stations, transmitting mobile station-specific information to a first target mobile station by transmitting in said broadcast data a first packet data unit containing a first local address identifier associated with said first target mobile station, transmitting multicast information to a first group of mobile stations by transmitting in said broadcast data a second packet data unit containing a second local address identifier associated with said first group of mobile stations,
    wherein said broadcast data comprises the first local address identifier and said mobile station-specific information, and wherein the first address identifier comprises fewer bits than the mobile station electronic serial number (ESN) value.

2. The base station as set forth in claim 1 wherein said base station transmits said broadcast data to said plurality of mobile stations using said shared PLCM and said shared WC.

3. The base station as set forth in claim 1 wherein said base station assigns said first local address identifier to said first target mobile station.

4. The base station as set forth in claim 1 wherein said base station assigns said second local address identifier to said first group of mobile stations.

5. A wireless network comprising a plurality of base stations, wherein a first one of said plurality of base stations is capable of transmitting broadcast data to a plurality of mobile stations over a shared traffic channel,
    wherein said base station is capable of transmitting a first control message over said shared traffic channel to said plurality of mobile stations, said first control message operable to assign a shared public long code mask (PLCM) to said plurality of mobile stations, transmitting a second control message to said plurality of mobile stations, said second control message operable to assign a shared Walsh Code (WC) to said plurality of mobile stations, transmitting mobile station-specific information to a first target mobile station by transmitting in said broadcast data a first packet data unit containing a first local address identifier associated with said first target mobile station, transmitting multicast information to a first group of mobile stations by transmitting in said broadcast data a second packet data unit containing a second local address identifier associated with said first group of mobile stations, wherein said broadcast data comprises the first local address identifier and said mobile station-specific information, and wherein the first address identifier comprises fewer bits than the mobile station electronic serial number (ESN) value.

6. The wireless network as set forth in claim 5 wherein said first base station transmits said broadcast data to said plurality of mobile stations using said shared PLCM and said shared WC.

7. The wireless network as set forth in claim 5 wherein said first base station assigns said first local address identifier to said first target mobile station.

8. The wireless network as set forth in claim 5 wherein said first base station assigns said second local address identifier to said first group of mobile stations.

9. For use in a wireless network, a method of transmitting broadcast data from a base station to a plurality of mobile stations in a coverage area of the base station using a shared traffic channel, the method comprising the steps of:

wherein said base station is capable of transmitting a first control message over said shared traffic channel to said plurality of mobile stations, said first control message operable to assign a shared public long code mask (PLCM) to said plurality of mobile stations, transmitting a second control message to said plurality of mobile stations, said second control message operable to assign a shared Walsh Code (WC) to said plurality of mobile stations, transmitting mobile station-specific information to a first target mobile station by transmitting in said broadcast data a first packet data unit containing a first local address identifier associated with said first target mobile station, transmitting multicast information to a first group of mobile stations by transmitting in said broadcast data a second packet data unit containing a second local address identifier associated with said first group of mobile stations, wherein said broadcast data comprises the first local address identifier and said mobile station-specific information, and wherein the first address identifier comprises fewer bits than the mobile station electronic serial number (ESN) value.

10. The method as set forth in claim 9 further comprising the step of transmitting the broadcast data to the plurality of mobile stations using the shared PLCM and the shared WC.

11. The base station as set forth in claim 9 wherein said base station assigns said first local address identifier to said first target mobile station.

12. The method as set forth in claim 9 wherein the base station assigns the second local address identifier to the first group of mobile stations.

13. The base station as set forth in claim 2 wherein the WC is used for broadcast services in a shared F-PDCH traffic channel.

14. The base station as set forth in claim 2 wherein the WC is used for broadcast services in a shared F-SCH traffic channel.

15. The wireless network as set forth in claim 5 wherein the WC is used for broadcast services in a shared F-PDCH traffic channel.

16. The wireless network as set forth in claim 5 wherein the WC is used for broadcast services in a shared F-SCH traffic channel.

17. The method as set forth in claim 9 wherein the WC is used for broadcast services in a shared F-PDCH traffic channel.

18. The method as set forth in claim 9 wherein the WC is used for broadcast services in a shared F-SCH traffic channel.

19. The method as set forth in claim 9, wherein the WC is transmitted within Extended Channel Assignment Message (ECAM).

20. The base station as set forth in claim 2 wherein the WC is transmitted within Extended Channel Assignment Message (ECAM).

* * * * *